Nov. 15, 1966  G. W. JACKSON  3,285,617
VEHICLE SUSPENSION SYSTEM
Filed June 28, 1965  3 Sheets-Sheet 1

INVENTOR.
George W. Jackson
BY
J. C. Evans
His Attorney

Nov. 15, 1966  G. W. JACKSON  3,285,617

VEHICLE SUSPENSION SYSTEM

Filed June 28, 1965  3 Sheets-Sheet 3

INVENTOR.
George W. Jackson
BY
J. C. Evans
His Attorney

United States Patent Office 3,285,617
Patented Nov. 15, 1966

3,285,617
VEHICLE SUSPENSION SYSTEM
George W. Jackson, Dayton, Ohio, assignor to General Motors Corporation, Detroit, Mich., a corporation of Delaware
Filed June 28, 1965, Ser. No. 467,412
2 Claims. (Cl. 280—6)

This application is a continuation-in-part of application, Serial No. 327,008, filed November 29, 1963, now U.S. Patent No. 3,215,339.

This invention relates to vehicle suspension systems and more particularly to vehicle suspension systems including a primary spring suspension component and a supplemental suspension unit including a hydraulic shock absorber in combination with an inflatable sleeve supported on and exteriorly of the shock absorber.

One problem in the suspension systems of many motor vehicles is that under certain loading conditions on the sprung mass associated primary spring suspension units are often compressed to a point where the sprung mass assumes an undesirable attitude with respect to the unsprung mass.

More particularly, in motor vehicles this condition is often present in the rear suspension of the vehicle chassis on an unsprung mass represented by ground engaging wheels supported on a rear axle. In such cases, the rear suspension typically includes a primary spring system including either coil springs or leaf springs supporting the vehicle chassis off the rear axle and when the loading on the vehicle chassis reaches a predetermined point typically the primary spring members are compressed to cause an undesirable upward inclination of the front of the vehicle chassis, and, furthermore, can cause the vehicle chassis to bottom on the axle whereby the chassis is subjected to relatively severe impacting during vehicle travel.

An object of the present invention, therefore, is to provide an improved automatic leveling rear suspension system for controlling the height relationship of a sprung mass and an unsprung mass that is readily adaptable for association with standard automotive vehicles between the sprung body and chassis thereof and the rear axle thereof without requiring modifications to the vehicle itself.

An object of the present invention is to improve the riding qualities of a vehicle by the provision of an improved automatic leveling rear suspension system including primary spring members supporting a vehicle chassis off the rear axle of the vehicle and a combination shock absorber and air spring unit having a pressurizable air chamber therein formed by the shock absorber and a flexible sleeve mounted on the exterior of the shock absorber wherein compressed air is directed from an improved low-profile compressor and reservoir into the pressurizable chamber of the auxiliary suspension unit under the control of an automatic leveling valve responsive to predetermined movements between the vehicle chassis and the rear axle of the vehicle and wherein improved valve means are included between the reservoir and pressurizable chamber to test the system and to control the maximum pressure build-up in the pressurizable chamber.

Further objects and advantages of the present invention will be apparent from the following description, reference being had to the accompanying drawings wherein preferred embodiments of the present invention are clearly shown.

Figure 1:
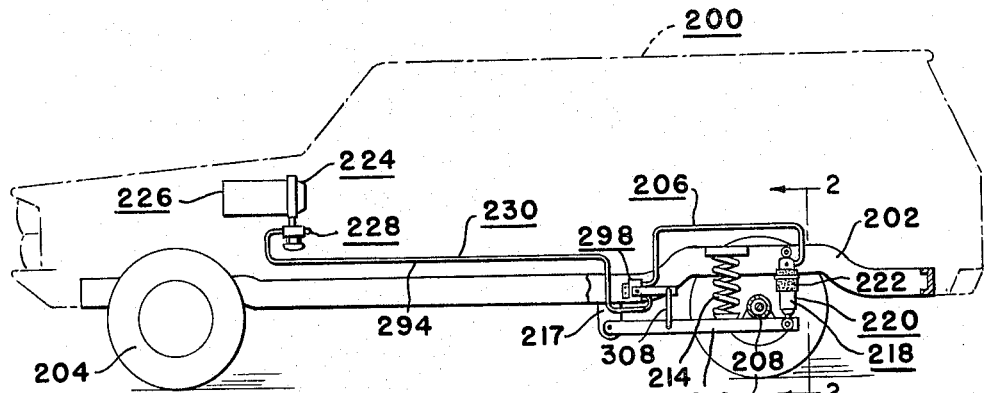
FIGURE 1 is a view in side elevation of a vehicle having another embodiment of an improved automatically controlled rear suspension leveling system.
Figure 2:
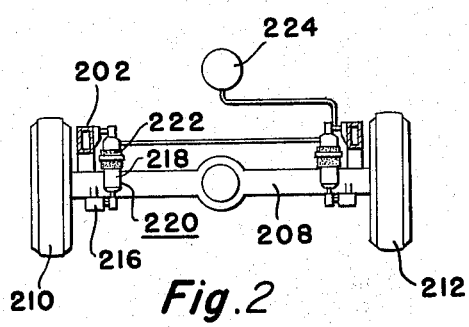
FIGURE 2 is a view in vertical section taken along the line 2—2 of FIGURE 1.
Figure 3:
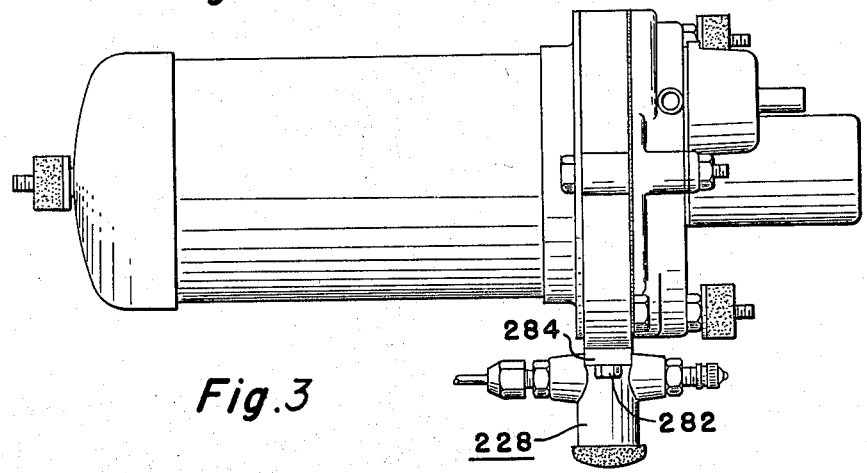
FIGURE 3 is an enlarged view in side elevation of a pressurized fluid supply system in the automatically controlled rear suspension leveling system of FIGURE 1.

In the embodiment of the invention illustrated in FIGURES 1 through 6, a vehicle 200 is shown in outline that includes a sprung frame 202 supported by a suitable front suspension assembly (not shown) associated with front ground engaging wheels 204 one of which is illustrated and by an improved automatic leveling rear suspension system 206 connected between the frame 202 and a rear axle housing 208 having ground engaging wheels 210, 212 rotatably supported thereon.

More particularly, the improved rear suspension 206 includes a primary spring adjacent each of wheels 210, 212. FIGURE 1 representatively shows the primary spring adjacent wheel 210 as being a coil spring member 214 having its lower end supported by one end of a control arm 216. The arm 216 is connected to the axle housing 208 and the opposite end thereof is pivotally connected to a depending member 217 on the frame 202. A like primary spring member and control arm is located adjacent the other wheel 212. The load carrying capacity of the primary spring member 214 is supplemented by a pair of auxiliary suspension units 218, 219 each including a double, direct-acting shock absorber 220 having its opposite ends, respectively, connected between the frame 202 and one end of the control arm 216. The units 218, 219 each also includes a flexible sleeve 222 on the outside surface of the shock absorber 220 that in cooperation with the shock absorber 220 forms a pressurizable chamber in a manner to be discussed. The system 206 further includes a low-profile combination two-stage diaphragm operated compressor 224 and reservoir 226. Pressurized air is directed therefrom through a control and test valve unit 228 on the compressor 224 thence through a supply system 230 to the pressurizable chambers formed by the sleeves 222 and shock absorbers 220.

Figure 4:
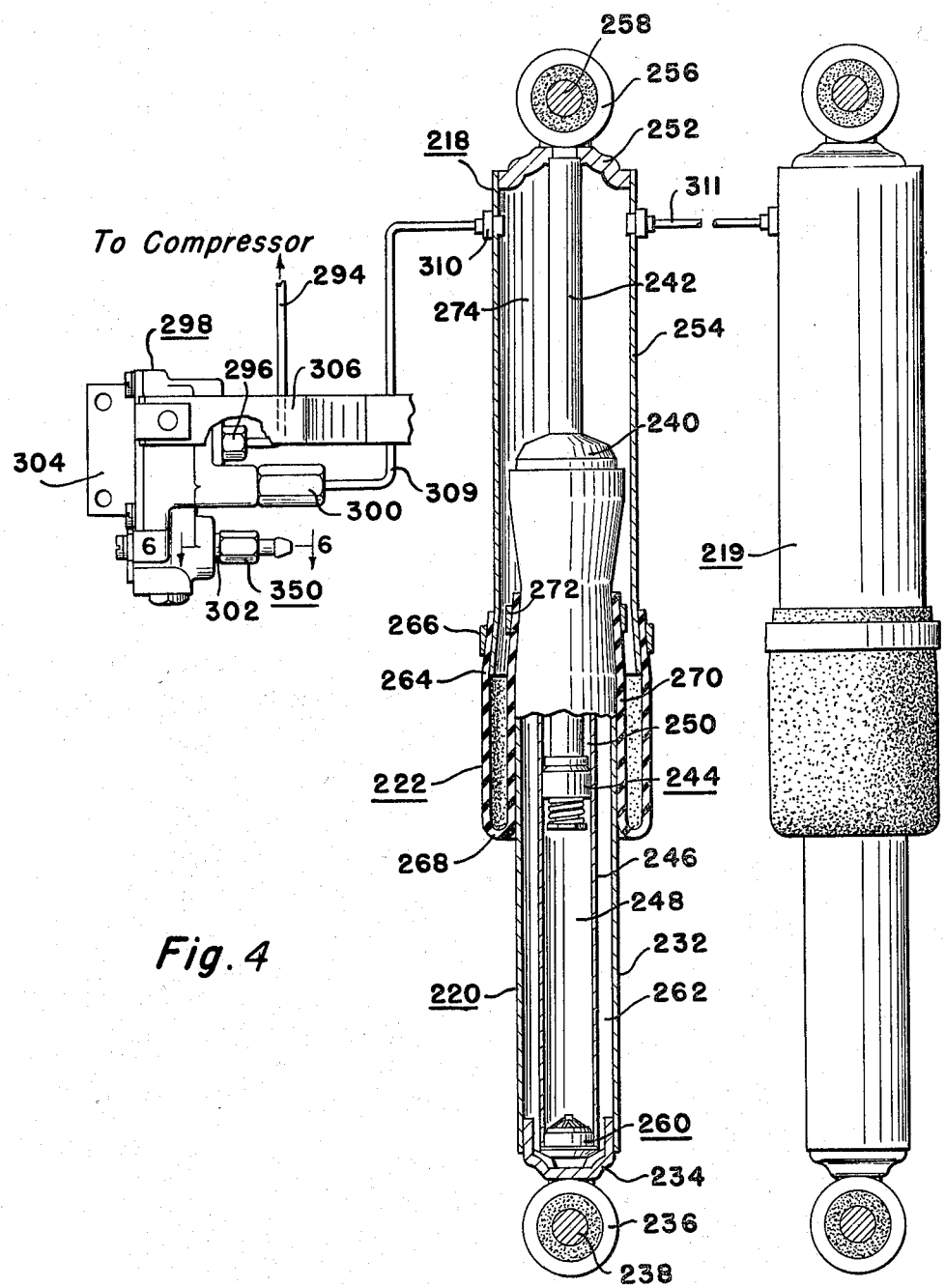
FIGURE 4 is an enlarged view partially in elevation and partially in section of the auxiliary suspension units of the embodiment of the invention shown in FIGURES 1 and 2 shown in association with an automatic control valve in the improved system.
Figure 5:
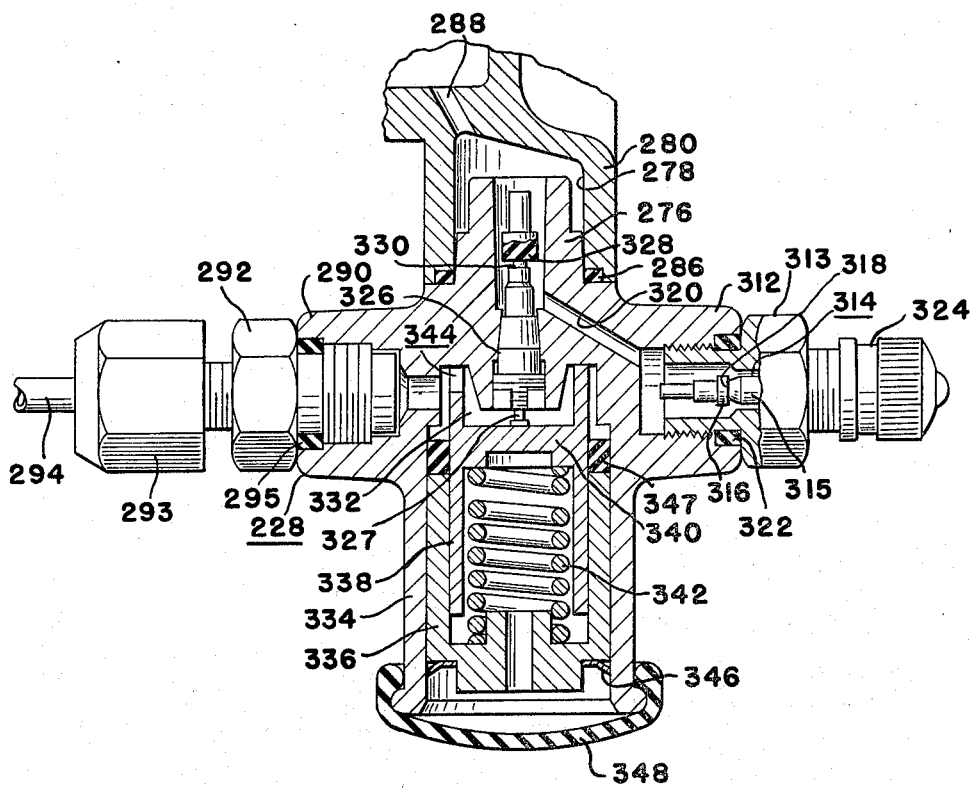
FIGURE 5 is an enlarged view in vertical section of a pressure regulator and testing unit in the system of FIGURES 1 and 2.

The auxiliary suspension units 218, 219 of the suspension 206 are more specifically set forth in FIGURE 4 where the unit 218 is shown as including a shock absorber reservoir cylinder 232 having one end thereof closed by an end closure member 234 secured to a bottom bearing mounting assembly 236 secured to the control arm 216 by a pin 238. The opposite end of the reservoir cylinder 232 is closed by an end closure member 240 through which is directed a piston rod 242 having one end thereof connected to a valved piston member 244 slidably received within a shock absorber pumping cylinder 246 to form in cooperation therewith a compression chamber 248 and a rebound chamber 250 filled with a suitable hydraulic fluid. The opposite end of the piston rod 242 is connected to a movable end member 252 of the shock absorber that supports a cylindrical dust shield member 254 that is concentrically arranged about the reservoir forming cylinder 232 at the upper end thereof. The end member 252 is fastened to an upper bearing mounting member 256 that is secured by means of a pin 258 to the frame member 202.

Upon a relative movement between the frame member 202 and the ground engaging wheels 210, 212 that moves the end mountings 236, 256 closer together, the piston rod 242 is directed interiorly of the pumping cylinder 246 to displace fluid therefrom through a base valve assembly 260 closing the bottom end of the cylinder 246. The fluid is directed from the base valve assembly 260 into a reservoir space 262 formed between the cylinders 232, 246. The controlling action of the base value 260 establishes a predetermined damping action on such relative movement between the sprung and unsprung masses of the vehicle. On relative movement between the masses that causes separation of the bearing mounts 236, 256, the piston rod 242 is withdrawn from the piston pumping cylinder 246 and make-up fluid flows from the reservoir 262 through the base valve assembly 260 into the compression chamber 248. Fluid flow across the valve piston assembly 244 during such movement effects a predetermined rebound damping action of the movement between the masses.

The details of the valved piston 244 and the base valve assembly 260 are set forth more specifically in United States Patent 2,695,034, issued November 23, 1954. The details form no part of the present invention and are merely representative of one suitable valving arrangement for use in a low-cost, double-acting hydraulic shock absorber that is suitable for association in the suspension system of the present invention.

The auxiliary suspension units 218, 219, each additionally includes means for supplementing the load-carrying capacity of the primary springs 214 in the rear suspension 206. More particularly, these means include a low-cost, reliable air spring supported on the conventional shock absorber 220 and comprising the dust shield member 254 and the flexible sleeve member 222. The flexible sleeve member 222 has one end portion 264 thereof fit over an open end of the dust shield member 254 and clamped thereto by a ring member 266; the portion 264 of the sleeve 222 connected to the dust shield 254 by the clamp ring 264 is connected to a U-bend portion 268 that connects to a sleeve portion 270 overlying the outer surface of cylinder 232. The sleeve portion 270 is secured at its free end to the cylinder 232 by a clamp ring 272. The sleeve member 222, dust shield 254 and cylinder 232 thereby form a pressurizable chamber 274 on each of the units 218, 219.

Compressed air for pressurizing the pressurizable chamber 274 is supplied from the pressurized reservoir 226 through the valve unit 228 which is more particularly show as being supportingly received on the underside of the pump 224 and as including a first tubular inlet fitting 276 directed into an opening 278 of an end housing portion 280 like housing portion 44 in the first embodiment. The valve unit 228 is secured to the housing portion 280 by suitable fastening means such as screws 282 directed through a flange 284 thereon into threaded engagement with the housing portion 280 whereby a shoulder on the tubular fitting 276 is held in a tight sealing engagement with an O-ring sealing element 286 supported within the housing portion 280 around the opening 278 therein. The housing portion 280 also has an opening 288 therein that communicates the opening 278 to the tubular inlet fitting 276 with the interior of the pressure reservoir 226. The valve unit 228 also includes a tubular outlet fitting 290 that is fluidly connected by an adapter 292 and a coupling 293 to a flexible air supply line 294. The fitting 290 has an annular seal member 295 located therein to sealingly engage adapter 292. The line 294 extends from the coupling 293 and has its opposite end connected to an inlet fitting 296 of an automatic height control valve 298. The height control valve 228 is of the type illustrated in United States Patent 2,967,547, issued January 10, 1961, to J. F. Pribonic and is more specifically the type illustrated in FIGURES 9 and 10 of this patent.

For purposes of the present invention the valve 298 can be generally described as also including an outlet fitting 300 and an exhaust fitting 302. Additionally, the valve 298 includes a support flange 304 adapted to be fixedly secured to the sprung mass and an oscillatable actuator arm 306 pivotally connected to a link 308 having the opposite end thereof pivotally connected to the unsprung mass of a vehicle. The valve 298, upon relative movement between the sprung and unsprung masses, serves to selectively direct pressurized fluid from the inlet line 294 through the outlet fitting 300 and a supply line 309 to an inlet fitting 310 to the pressurizable chamber 274 of unit 218, as best seen in FIGURE 4. A balance line 311 directs pressurized air to and from the chamber 274 of unit 218 and the like chamber in unit 219. The valve 298 also serves to control the flow of pressurized fluid from the units 218, 219 out of the inlet fitting 310 back through the supply line 309 to be exhausted through the exhaust fitting 302.

The valve 298 is characterized by a time delay whereby high frequency movements of the actuator arm 306 produced by a sudden relative movement between the sprung and unsprung mass as, for example, those movements produced by normal road action are effectively damped out of the system whereby pressurized flow through the outlet fitting 300 and exhaust fitting 302 is dependent upon the relative movement between the sprung and unsprung masses produced by changes in the loading on the unsprung mass that effect a continuous change in the height relationship between the sprung mass and the unsprung mass.

Referring now more particularly to the valve unit 228, the outer housing thereof also includes a tubular inlet portion 312 that supportingly receives an adapter fitting 313 having a control valve 314 therein of the Schrader type including a body portion 315 secured within the adapter fitting 313 whereby an actuator stem portion of the valve (not shown) is accessible through the outer end of the fitting 313. A valving element 316 is movable by the actuator stem with respect to a seat 318 whereby pressurized fluid can be directed through the inlet fitting 312 and thence through an inclined passageway 320 in the valve housing that communicates with the interior of the tubular inlet portion 276. An O-ring 322 in the end of fitting 312 seals against adapter fitting 313. A cap 324 normally is fitted on the outer end of the adapter.

The tubular inlet 276 serves to support a second control valve 326 having an actuator stem 327 on one end thereof and a valving element 328 on the opposite end thereof within the tubular fitting 276. The element 328 cooperates with a seat 330 to control flow from the interior of the tubular portion 276 interiorly of the valve housing into a control chamber 332 therein. The chamber 332 is formed by a large diameter tubular extension 334 of the valve housing that is arranged concentrically of the tubular inlet 276. Within the tubular large diameter extension 334 is located a sleeve member 336 that slidably supportingly receives a piston 338 having a head portion 340 thereon held against the stem 327 by a spring 342 located interiorly of the piston 338 with one end thereof held against the end of the sleeve 336 and the opposite end thereof against the head portion 340 whereby the stem 327 is normally maintained in a depressed position whereby the valving element 328 is spaced from the seat 330 so that fluid is free to flow from the pressurized reservoir 226 into the pressure control chamber 332 or alternatively from the control valve 314 thence through the passageway 320 into the chamber 332. The spring biased piston 338 is acted upon by the pressure in chamber 332 to serve as a regulator for maintaining a predetermined fluid pressure that flows through an opening 334 in the end of the piston 338 and thence through the adapter 292 in the outlet fitting 290 through the air supply line 294 to the automatic height control valve 298.

The sleeve 336 is retained in the large diameter tubular extension 334 by a suitable fastening means such as a multi-fingered snap ring or retainer 346 that frictionally engages the inner surface of the extension 334. An annular seal member 347 is located on top of sleeve 336 to prevent fluid leakage from the chamber 332. The end of the assembly is sealed by a cover 348 fastened over the open end of the extension 334.

By virtue of the illustrated valve unit 228, during normal operation of the compressor 224, the unit 228 will act to maintain a predetermined regulated pressure flow from the reservoir 226 to the height control valve 298 for subsequent automatically controlled flow to the units 218, 219 to maintain a desired predetermined height relationship of the sprung mass with respect to the unsprung mass. The regulated pressure prevents an undesirable pressurization of the units 218, 219 that might rupture the sleeve members 222. Additionally, the valve unit 228, by the provision of the inlet fitting 312 thereon, enables the system to be precharged for testing merely by connecting a source of pressure to the adapter 313 and operating the valve 314 to cause fluid flow through the passageway 320 into the inlet fitting 276 and across the valve 326 into the pressure control chamber 332, thence through the outlet fitting 290 into the height control valve 298. The reservoir 226 is concurrently pressurized. When the valve 298 is opened the complete system is prepressurized whereby all of the fluid connections therein can be tested for leaks without requiring that vacuum operator compressor be operator.

Additionally, the tubular inlet fitting 312 can serve as a means for draining condensate from the pressurized reservoir 226. Condensate therein will collect within the tubular extension 276 and drain through the inclined passageway 320 into the tubular fitting 312. By virtue of this construction, merely by removing the adapter 276, a user of the system is able to remove condensate therefrom.

Figure 6:
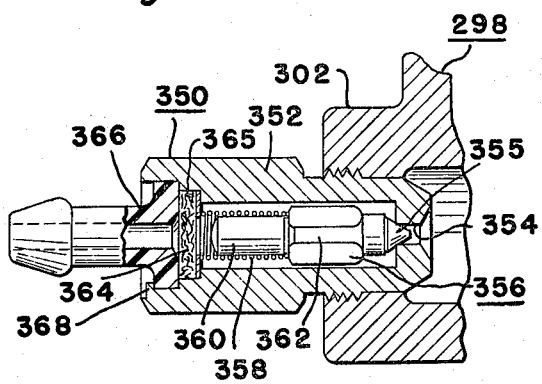
FIGURE 6 is an enlarged view in horizontal section taken along the line 6—6 of FIGURE 4.

A further feature of the present invention is the provision of an improved minimum pressure cutoff assembly 350 in the automatic height control valve assembly 298 as best seen in FIGURE 6. The assembly 350 more particularly includes a tubular outer housing 352 having a threaded end thereof threadably received by the exhaust fitting 302 on the valve 298 so that the interior thereof is communicated through an end opening 354 therein with the interior of the valve assembly 298. Accordingly, when the valve 298 is operated to exhaust flow from the pressurized chambers 274 of the units 218, 219 through the fitting 310 and line 309 into the outlet fitting 300, the pressure will act against a generally conically-shaped end 355 of a valving element 356 that closes the opening 354. The element 356 is movable axially against the biasing action of a coil spring 358 surrounding a guide pin 360 on the opposite end of the element 356. The element 356 has a plurality of circumferentially spaced guide ribs 362 that center the element within the housing 352 for free sliding reciprocable movement therein. An insert element 364 is received within an end opening 365 in the housing 352 and held therein by a bayonet-type outlet fitting 366 secured to the housing 352 by staking over portions thereof against fitting 352 as shown at 368. The spring 358 and valve element 356 maintain a predetermined minimum pressure in the units 218, 219 whereby the flexible sleeve portions 222 thereof do not collapse upon themselves to wear in an undesirable manner. In the illustrated arrangement the insert element 364 is of a porous fibrous material, for example, felt, that serves as a noise silencer when air is discharged through the exhaust fitting 302.

In summary, the illustrated arrangement in FIGURES 1–6 is capable of quickly and completely automatically leveling the rear of an automobile body or the like to a predetermined height relationship relative to its rear axle. The system is further characterized by its compactness with the combination compressor and pressure reservoir being adapted for mounting within the engine compartment of the vehicle and the time delay height control valve and supplemental load carrying units being readily mountable between the sprung and unsprung masses of the vehicle adjacent the rear axle thereof. Hence, the system is readily adapted for association with most vehicles commonly in use without requiring expensive modifications thereto.

A further feature of the system is the quietness of operation afforded by the compressor noise dampers and the exhaust silencer.

While the embodiments of the present invention as herein disclosed constitute preferred forms, it is to be understood that other forms might be adopted.

What is claimed is as follows:

1. An automatic and manual air supply system for supplying pressure to an air actuated spring of an automatic leveling rear suspension system for automatically leveling a sprung mass with respect to an unsprung mass, comprising a pressure receiver having an open end, an air compressor having a housing portion forming an outlet opening therefrom, said housing portion serving to close said open end of said receiver and to locate said outlet opening interiorly of said receiver, means forming an outlet opening in said housing portion for directing pressurized fluid exteriorly of said receiver, a regulator housing having a first tubular portion supportingly received by said housing portion for receiving fluid from said outlet opening therein, a second tubular portion formed coaxially of said first tubular portion forming a pressurizable control chamber, a third tubular portion serving as an outlet from said pressurizable control chamber, a fourth tubular portion formed coaxially of said third tubular portion, means for communicating the interior of said first and fourth tubular portions, first valve means in said first tubular portion for controlling fluid flow from said receiver into said pressurized control chamber, said first valve means including an actuatable stem for opening and closing communication between the interior of said first tubular portion and said pressurizable control chamber, means within said third tubular portion including a reciprocal piston member having a portion thereof in engagement with said stem, and spring means for biasing said piston means into engagement with said stem for effecting a predetermined opening movement thereof opposed by a predetermined pressure build-up in the pressurizable control chamber, a second valving element supported within said fourth tubular member for manually directing pressurized fluid into said pressurizable control chamber of said regulator independently of pressure buildup in said pressure receiver produced by said air compressor.

2. In the combination of claim 1, said first valve means having a housing disposed within and spaced with respect to said first tubular portion to form a well for collecting liquid condensate from said receiver, means forming a passageway in said regulator housing for draining collected condensate from said well into said fourth tubular portion of said regulator housing, said second valve means being removably insertable into said fourth tubular portion to allow selective drainage of liquid condensate collected in said fourth tubular portion of said regulator housing.

References Cited by the Examiner

UNITED STATES PATENTS

| | | | |
|---|---|---|---|
| 2,630,102 | 3/1953 | Osburn | 91—327 |
| 2,967,547 | 1/1961 | Pribonic | 137—627.5 |
| 2,989,978 | 6/1961 | Gresko | 137—627.5 |
| 3,064,995 | 11/1962 | Weller | 280—124 |
| 3,071,394 | 1/1963 | Miller | 280—124 |
| 3,083,026 | 3/1963 | Broadwell | 280—6 |
| 3,104,119 | 9/1963 | Long | 267—64 X |
| 3,140,098 | 7/1964 | Broadwell | 280—6 |
| 3,151,804 | 10/1964 | Flame | 230—52 |
| 3,162,433 | 12/1964 | Smirl | 267—65 |
| 3,173,671 | 3/1965 | Broadwell | 280—124 X |

BENJAMIN HERSH, *Primary Examiner.*

W. A. MARCONTRLL, *Examiner.*

M. S. SALES, *Assistant Examiner.*